Figure 1:
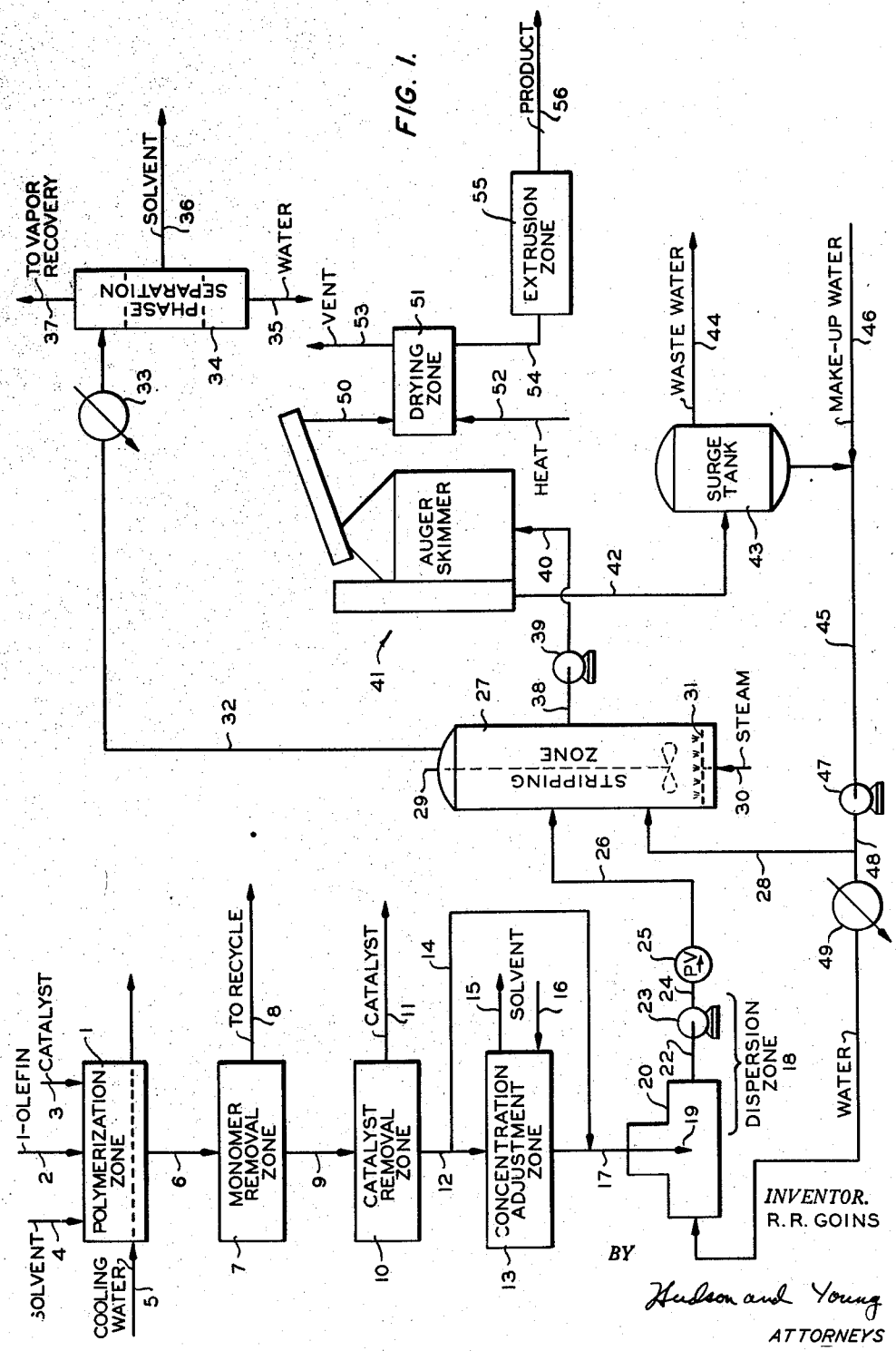

INVENTOR.
R. R. GOINS

United States Patent Office 2,955,714
Patented Oct. 11, 1960

2,955,714

APPARATUS FOR SEPARATING SOLIDS AND LIQUIDS

Robert R. Goins, Bartlesville, Okla., assignor to Phillips Petroleum Company, a corporation of Delaware Filed Nov. 19, 1956, Ser. No. 623,075

8 Claims. (Cl. 210—519)

This invention relates to method and apparatus for separating solids and liquids. In one aspect it relates to a method for separating solids and liquids by passing said solids upwardly along an inclined surface and simultaneously providing agitation and tumbling of the solids. In another aspect it relates to a skimming and auger apparatus for separating a mixture of floatable solids and liquids.

As used herein the term "floatable solids" is intended to mean solids which are capable of being separated from a liquid by flotation.

In many processes in which finely divided solids are handled it becomes necessary to separate the solids from a liquid. An example is in the preparation of solid polymers, such as polymers of olefins. In certain methods of preparing solid olefin polymers the reaction product is obtained as a solution of polymer in a solvent or diluent material. Since the major uses of the polymer require a solid product, it is desirable that the polymer be separated from the solvent material, such as by precipitation methods. In one method which is described in detail in a co-pending application of R. G. Wallace, Serial No. 584,812, filed May 14, 1956, now abandoned, a slurry of precipitated polymer in solvent is provided by spraying a solution of polymer into liquid water whereby the polymers are dispersed in the water and removed from the solution. This operation is carried out by combining the water at a temperature between about 60° F. and about 110° F. with a polymer solution having temperature of between about 350° F. and about 200° F. to proivde a mixture of polymer, water and solvent having a temperature between about 110° F. and about 150° F. Usually the amount of water required is between 1 and about 5 lbs./lb. of polymer solution. Sufficient pressure is required during the process to maintain the solvent and water in liquid state. After the precipitation step the polymer is present in a subdivided solid form, mixed with water and solvent. A major portion of the solvent can be removed by stripping, however the problem still remains of separating the water whereby a dry polymer product can be obtained.

It is an object of this invention to provide improved method and apparatus for separating solids from a solid-liquid mixture.

Another object of this invention is to provide an improved apparatus for separating floatable solids from a liquid Still another object of this invention is to provide improved method and apparatus for separating floatable solids from a liquid while transporting said solids.

Yet another object of this invention is improved method and apparatus for recovering solid olefin polymers from a mixture of polymer and water.

These and other objects of the invention will become more readily apparent from the following detailed description and discussion.

The foregoing objects are achieved broadly by passing a solids-liquid mixture upwardly along an inclined surface and simultaneously providing a degree of agitation and tumbling of the solids. In one embodiment the solids-liquid mixture to be separated is introduced to a skimming tank superposed by an inclined auger, which at its end of lower elevation is in open communication with the skimming tank. The skimming tank is carried liquid full whereby all of the solids introduced thereto are readily taken up by the auger being discharged at the end of higher elevation. Due to the density of the solids, the elevation of the auger and the tumbling effect provided during passage of the solids through the auger the concentration of solids in the mixture leaving the auger is substantially increased. As desired additional drying can be provided by discharging the concentrated solids mixture to a secondary dryer, such as for example, a rotary steam dryer, air dryer, etc.

In one aspect of the invention, in which the separated solids are the type which tend to bridge in constricted parts of the apparatus, it is necessary that the inlet and outlet termini of the auger have a cross section at least equal to the cross section of the auger and preferably larger.

The method and apparatus of this invention can be used in general in the treatment of solid-liquid mixtures from which the separation of solvents can be effected by flotation. Thus, for example the invention can be used in ore flotation processes, in the separation of low density materials, like cork from liquids, and in the separation of solid compounds, chemicals, etc., such as olefin polymers from various liquids.

The invention will be described in conjunction with an olefin polymerization process and recovery system, however, this is not intended in any way to limit the scope of the invention which includes the separation of other liquids and solvents as stated.

Solid olefin polymers are prepared usually by contacting the olefin to be polymerized with a catalyst at an elevated temperature and pressure, often in the presence of a solvent or diluent material. The reaction product can be one of a wide variety of olefin polymers, such as for example, polymers or copolymers of monoolefins like ethylene, propylene, butylene, etc., also copolymers of monoolefins and diolefins such as butadiene, isoprene, etc.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. When utilizing a fixed catalyst bed the space velocity varies from as low as about 0.1 to about 20 volumes of feed per volume of catalyst per hour, with the preferred range being between about 1 and about 6 volumes per volume per hour. The polymerization process can also be carried out in the presence of a mobile catalyst. In this type of operation the catalyst concentration in the reaction zone is maintained between about 0.01 and about 10 percent by weight and the residence time is from 10 minutes or less to 10 hours or more.

A preferred polymerization method is described in detail in a copending application of Hogan and Banks, Serial No. 573,877, filed March 26, 1956, now Patent No. 2,825,721. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acylic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity, usually greater than 90% at normal atmospheric temperatures.

Other less advantageous and nonequivalent procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The solvent or diluent employed in the polymerization reaction includes in general, paraffins which can at least partially dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however in some instances they (or impurities therein) tend to shorten the catalyst life, therefore their use will depend on the importance of catalyst life. All of the foregoing and in addition other hydrocarbon diluents which are relatively inert and in the liquid state at the reaction conditions may also be employed in carrying out the reaction of olefins to form solid polymers.

It is apparent from the preceding discussion that the solid polymers prepared by the aforedescribed methods are present in the reaction effluent as a solution of polymer in a solvent or diluent. Inasmuch as the major uses of the polymers require a solid product, it is desirable that the polymer be separated from the solvent material. Several methods have been proposed for treating the polymer solution to accomplish this purpose. In one method, the polymer solution is sprayed into liquid water whereby the polymer is dispersed in the water and removed from solution. This process is described in detail in a copending application of R. G. Wallace, Serial No. 584,812, filed May 14, 1956, now abandoned.

As a result of the foregoing treatment, the polymer product is obtained as a slurry of subdivided solids in a mixture of water and solvent. To obtain the desired dry product the slurry is treated first for the removal of the major portion of the solvent and then for the removal of the major portion of the water. In one method, solvent removal is effected by steam distillation following which a large proportion of the water is removed in a skimming operation.

Figure 2:
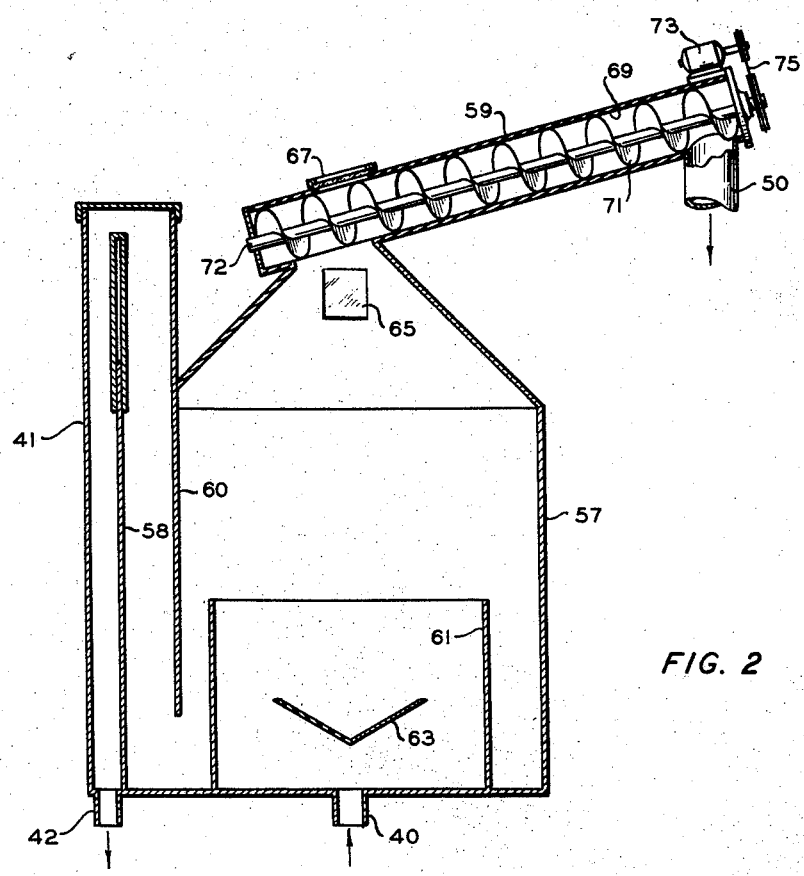
Figure 3:
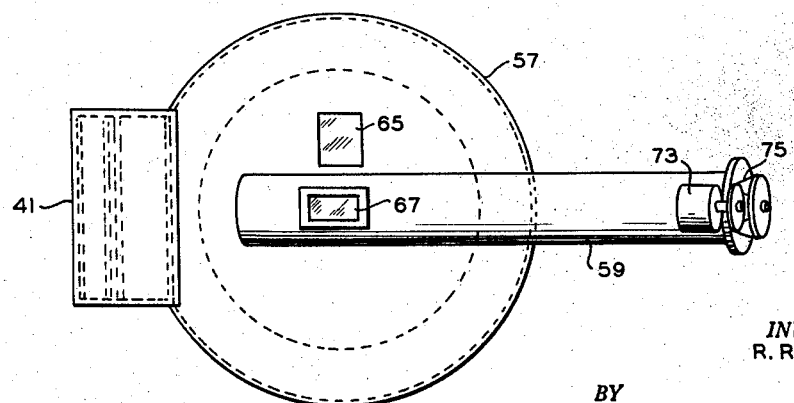

The apparatus of this invention and the operation thereof are best described by reference to the attached drawings of which, Figure 1 is a diagrammatic illustration of an olefin polymerization process and associated recovery equipment, Figure 2 is a side view and top view of a skimming tank and auger as employed in this invention, and Figure 3 is a plan view of Figure 2.

Referring now to the drawings, a feed stream consisting essentially of the polymerizable monoolefin, ethylene for example, is passed to polymerization zone 1 via conduit 2. A chromium oxide catalyst, containing hexavalent chromium, associated with silica-alumina is introduced to said polymerization zone via conduit 3. The catalyst is usually dispersed in at least a portion of the solvent. Any additional solvent (cyclohexane) is added to polymerization zone 1 via conduit 4. The ingredients in each of these conduits 2, 3 and 4 are preferably at polymerization temperatures (230–300° F.), however, one or more streams can be cooler with remaining streams warmer so that the resulting dispersion is at the proper temperature. It should also be understood that the monoolefin and solvent can be premixed, if desired. The polymerization reaction is exothermic so that it is necessary to remove heat from the polymerization zone. This can be accomplished by indirect heat exchange, for example, cooling water in conduit 5. The polymerization zone effluent, at about 280° F. from zone 1 passes via conduit 6 to monomer removal zone 7 wherein unreacted ethylene is vaporized and removed via conduit 8 to ethylene recycle and any undissolved polymer is dissolved by heating, additional solvent being added as desired. The mixture passes from monomer removal zone 7 via conduit 9 to catalyst removal zone 10 wherein the solution and catalyst are separated. The catalyst is removed via conduit 11. The polymer solution is passed from separation zone 10 via conduit 14. In general, the polymer concentration in conduit 12 is low and solvent is removed from zone 13 via conduit 15. On the other hand, if the concentration is high, solvent can be added via conduit 16. The solution is cooled in this zone, either by evaporation or by cool solvent to about 240° F. The polymer concentration is adjusted to about 4.5 percent polymer in this example. In any case, the solution is passed to dispersion zone 18 wherein the polymer solution is dispersed in water of lower temperature so as to cause polymer to precipitate under such conditions that both the water and solvent remain as liquid phases. In this embodiment, the solution passes from conduit 17 through nozzle 19 into a stream of water in pipe T 20. Nozzle 19 is positioned in said T so as to disperse the solution into the water stream. Water at about 100° F. enters T 20 via conduit 45. The resulting dispersion passes through conduit 22 to centrifugal pump 23. Dispersion by spray nozzle is preferred but other dispersion means such as colloid mill, mixing T, combination of these means, and the like can also be used. Sufficient water is admixed with the solution to provide a resulting temperature in the range of 100° to 130° F. and preferably about 120° F. The resulting dispersion passes via conduit 24 to pressure reducing valve 25 which holds the desired pressure on the dispersion zone, in this case about 35 to 45 pounds per square inch gauge. It will be understood by those skilled in the art that other pressure reducing means can be used, e.g., sufficient length of pipe, an orifice and the like. The material passes through line 26 directly to the stripping zone 27. The stripping zone can be operated at any desired temperature and pressure so long as solvent is vaporized. Preferably, the stripper will operate at atmospheric pressure and at about 170° F., however, under vacuum, the temperature will be lower, e.g., 140° F. for 7 p.s.i.a. Since the polymer is lighter than water and will float, an agitator 29 is provided to maintain the solids in dispersion. This agitator is rotated at a speed preferably in the range of 25 to 200 r.p.m. and in this example at about 85 r.p.m. While any means of supplying heat in the stripping zone can be used, steam is especially effective. Steam from conduit 30 is supplied to the steam stripper via steam nozzle head 31.

Steam and solvent vapor pass overhead from stripping zone 27 via conduit 32 to condenser 33, where most of the vapors are condensed and then pass to separation zone 34. The solvent and water form two layers in this zone 34 and water is removed via conduit 35 while solvent is removed via conduit 36. Non-condensibles and uncondensed vapor pass overhead from zone 34 via conduit 37. The polymer residence time in this stripping zone is in the range of 20 to 30 minutes.

A mixture of polymer solids and water is removed from the stripping zone 27 to conduit 38 and pump 39 and discharged through conduit 40 to skimming tank 57. This tank comprises a first cylindrical section having a conical shaped top which is truncated by the lower terminus of inclined auger 59 and a second adjoining section 41 which has one wall 60 in common with a wall of the first section. The second section of the skimming tank is rectangular in cross-section and of a higher elevation than the first section. Within the second section there is an adjustable weir 58 which is sealed at the bottom and open at the top whereby water entering this section from the first section flows upwardly over the weir and out of the bottom of the second section through conduit 42. The second section is covered at the top with a loose fitting cover plate. Communication between the two sections is provided at the bottom of the common wall. Within the first section of the skimming tank there is provided a third cylindrical section 61 of smaller cross-section which encloses the slurry entry conduit 40. This section contains a diverter shield 63 and has walls which extend upwardly to a level above the top of the opening between the first and second sections of the skimming tank.

Inclined auger 59 comprises a barrel 69 which encloses a continuous screw or auger 71 having a shaft 72 extending through and supported by the closed ends of said barrel. Rotation of the auger is provided by a gear head motor 73 which is connected to the auger shaft by a V-belt 75. As previously stated the lower terminus of the auger assembly communicates with the top of the skimming tank. The upper terminus of the auger assembly communicates with outlet conduit 50. Preferably both termini and also conduit 50 have cross-sectional areas equal to or greater than the cross-sectional areas of barrel 69.

The inclination of auger 59 from the horizontal can vary over a substantial range from as low as 10 degrees to as high as 30 degrees or higher. In general the lower limit of the inclination depends on the height of the liquid level in the auger and the upper inclination limit is a function of the carrying capacity of the auger, which usually falls off sharply above about 30 degrees.

In operation polymer slurry entering the skimming tank contacts diverter 63 whereby turbulence is reduced and passes upwardly through the third section 61 and enters the main section 57 of the skimming tank. The polymer solids being lighter than the water continue upwardly past window 65 and enter the lower terminus of auger 59. By virtue of the location of adjustable weir 58 the skimming tank is operated liquid full, with the water extending upwardly into the lower terminus of the auger. Water which separates from the polymer, passes from the main section 57 of the skimming tank into the adjacent section 41 wherein it flows upwardly over adjustable weir 58 and out through the bottom of section 41 through conduit 42. The polymer solids and water entering the auger are passed upwardly and exit from the upper terminus of the auger through conduit 50. Due to the inclination of the auger and the tumbling action of the polymer as it passes therethrough an additional amount of water is released from the polymer solids. This water flows downwardly through the auger and passes from the skimming tank through conduit 42, as previously described.

The degree of tumbling and agitation provided in the auger has a substantial effect on the amount of moisture retained by the solids discharged from the auger. A large portion of the water associated with the solids can be removed merely by draining action, however, draining alone, without movement of the solids particles with respect to each other allows pockets of water to accumulate in the solids. Mild tumbling or agitation acts to break up these pockets and allows additional water to escape. If the tumbling or agitation becomes violent however, there is a tendency for water to remain distributed throughout the solids and free drainage is hindered. The auger type apparatus is particularly adapted to effect the desired agitation or tumbling since usually several rotations of the auger are required to effect a complete turnover of solids passing therethrough. The optimum amount of tumbling or agitation required is a function of the velocity, loading and inclination of the auger means.

Many of the solids which can be processed in the apparatus of this invention tend to agglomerate or adhere to the metal surfaces. When treating such solids it is important that the outlet of the upper terminus of the auger be of a sufficient size to minimize agglomeration and possible plugging. It is desirable when treating such solids that the auger outlet have a cross-section at least equal to the cross-section of the auger and preferably larger. The same considerations are important in determining the size of conduit 50. In addition to window 65 which is shown in the side view, an additional window 67 is provided in the top of the apparatus whereby a visual observation of the operation of the apparatus can be had.

The preceding discussion and description have been directed to a preferred embodiment of the invention, however, this is not intended in any way to limit the scope of the invention. Thus although in the preceding discussion the skimmer tank has been described as having a conical shaped top it is within the scope of the invention to use other shapes, including an inverted V top having vertical end sides or a multisided top, such as a pyramid, wherein each wall slopes. When utilizing a conical top the slope of the cone is preferably not less than about 30 degrees measured from the horizontal. The same minimum slope has been found effective with an inverted V top, however, when a pyramid top is used it is desirable to increase the minimum slope to about 40 to 50 degrees, since the latter slope provides a less efficient operation.

It is also within the scope of the invention to use in place of the single auger shown in the drawing, a double auger wherein the auger flights intermesh thereby giving substantially positive displacement. With this type of apparatus the maximum inclination of the auger can be increased substantially above 30 degrees.

Again it is within the scope of the invention to provide means other than an auger for separating the solids and liquids. Thus for example, the barrel 69 can contain a continuous conveyor of the bucket or similar type, adapted to agitate and tumble the solids as they pass upwardly from the skimming tank.

The apparatus of this invention provides important advantages over apparatus previously employed for separating solids and liquids. By terminating the auger at the top of the skimming tank and by carrying a liquid level within said auger it is possible to almost completely prevent build-up of polymer in the skimming tank. If the auger were extended downwardly into the skimming tank, dead spots would develop above the bottom portion of the auger wherein polymer would accumulate, eventually agglomerating into a large mass which possibly could plug off the auger. In the apparatus of this invention polymers entering the skimmed tank immediately pass upward into the auger and are withdrawn. Provision of an inclined auger in conjunction with a skimming tank also assures increased separation of solids and liquid and provides an apparatus by means of which the solids can be transported without compaction. By providing an unrestricted auger having an inlet and outlet of a cross section at least equal to the cross section of the auger plugging or bridging of solids in the auger outlet is substantially prevented.

The apparatus of this invention has been described by reference to a particular embodiment thereof. This however is not intended in any limiting sense and other equivalent apparatus can be used within the scope of the invention. For example, the liquid level in the auger assembly can be maintained by installing a level control in section 41, actuated by the flow through conduit 42. Also other suitable means can be provided to reduce turbulence in the skimmer, such as a vertical baffle arrangement, or the skimmer, if desired, can be operated without turbulence reducing means. Furthermore, various driving means can be provided to rotate the auger other than the motor and belt assembly illustrated.

The following operating data is presented in illustration of a preferred application of the invention.

EXAMPLE

A solid ethylene polymer was prepared in a reactor in the presence of a chromium oxide catalyst, containing hexavalent chromium, having a composition of about 2.5 weight percent chromium and about 2.2 hexavalent chromium, associated with silica-alumina prepared by impregnating silica-alumina with chromium trioxide solution followed by drying and activation in dry air for several hours at temperatures up to 950° F.

The reactor effluent was processed in a series of operations corresponding to those shown in Figure 1 of the drawings including unreacted ethylene removal, catalyst removal, effluent concentration, precipitation of the polymer in water and stripping of the precipitate slurry to remove solvent. Following this operation, the slurry of polymer in water was processed in an auger skimming apparatus of the type previously described. The conditions obtaining during this treatment were as follows:

*Flows*

| | |
|---|---|
| Feed to skimmer (40)_____lb./hr__ | 9,624 |
| Composition: | |
| Water _____wt. percent__ | 99.75 |
| Polymer _____wt. percent__ | 0.25 |
| Water from skimmer (solids free) (42)__lb./hr__ | 9,596 |
| Solids from auger (50)_____lb./hr__ | 28 |
| Composition: | |
| Water _____wt. percent__ | 13.3 |
| Polymer _____wt. percent__ | 86.7 |
| Temperature of feed to skimmer_____° F__ | 177 |
| Skimmer pressure _____ | Atm. |
| Auger speed_____r.p.m__ | 22 |
| Duration of test_____hrs__ | 5.75 |

The above operation was carried out in a skimmer comprising a 55 gallon drum having a 45 degree conical top fabricated from sheet aluminum, truncated by a barrel conveyor inclined at an angle of 20 degrees to the horizontal and containing a stainless steel auger driven by a gear head motor through a V-belt. The barrel was constructed of 4″ schedule 40 aluminum pipe (inner diameter 4.026″) and the auger contained a series of eleven flights having a diameter of 3.5″ and a pitch of approximately 1.1. The overall length of the barrel was 51.5″ and the polymer outlet was constructed of 4″ schedule 40 aluminum pipe.

It is to be noted that operating with the method and apparatus of this invention provides a solid polymer product containing about 13 percent water. A conventional skimmer was also tested under the same conditions and provided a product containing about 30 percent water, approximately 2½ times as much.

Having thus described the invention by providing an example thereof, it is to be understood that no undue limitations or restrictions are to be drawn by reason thereof and that many modifications and variations are within the scope of the invention.

I claim:

1. Apparatus comprising, in combination: a cylindrical skimming tank having a conical top section, adapted to hold a liquid and a floatable solid, and comprising a first confined section, an adjacent second confined section of greater height than the first confined section, the two sections openly communicating through the bottom portion of a common wall; means for introducing a liquid and floatable solids to the first confined section; means for withdrawing liquid from the second confined section; inclined auger means having a terminus in open communication with the top portion of the first confined section, said top portion being truncated by the lower terminus of said auger means, means in the second confined section for maintaining a liquid level above the lower terminus of said auger means and drive means for actuating said auger means.

2. The apparatus of claim 1 in which the outlet terminus of the inclined auger means openly communicates with a drying means.

3. The apparatus of claim 1 in which the means in the second confined section for maintaining a liquid level above the lower terminus of the auger means is an adjustable weir.

4. Apparatus comprising, in combination: a cylindrical skimming tank having a conical top section, adapted to hold a liquid and a floatable solid, and comprising a first confined section, an adjacent second confined section of greater height than the first confined section, the two sections openly communicating through the bottom portion of a common wall, a third inner section of smaller cross section within the first confined section openly communicating with the first confined section in an upward direction and having walls elevated above the top of the opening between the common wall connecting the first confined section and the second confined section; means for introducing a liquid and floatable solid to said inner section; means for withdrawing liquid from the second confined section; inclined auger means having a lower terminus in open communication with the top portion of the first confined section, said top portion being truncated by the lower terminus of said auger means, adjustable weir means for maintaining a liquid level above the lower terminus of said auger means; and drive means for actuating said auger means.

5. The apparatus of claim 4 in which the outlet terminus of the auger means openly communciates with a drying means.

6. The apparatus of claim 4 in which the inlet and outlet termini of the auger means have cross sectional areas at least equal to the cross sectional area of said auger means.

7. Apparatus comprising, in combination: a skimming tank having a tapered top section, adapted to hold a liquid and a floatable solid, and comprising a first confined section, an adjacent second confined section of greater height than the first confined section, the two sections openly communicating through their bottom portions; means for introducing a liquid and floatable solids to the first confined section; means for withdrawing liquid from the second confined section; inclined solids conveying means having a terminus in open communication with the top portion of the first confined section, said top portion being truncated by the lower terminus of said solids conveying means; means in the second confined section for maintaining a liquid level above the lower terminus of said solids conveying means; and drive means for actuating said solids conveying means.

8. Apparatus according to claim 4 wherein a diverter is positioned within said third inner section opposite the opening of said means for introducing liquid and floatable solid, said diverter being adapted to reduce turbulence.

References Cited in the file of this patent

UNITED STATES PATENTS

| | | |
|---|---|---|
| 1,648,607 | Brown | Nov. 8, 1927 |
| 1,688,998 | Swinney | Oct. 23, 1928 |
| 2,137,421 | Tark | Nov. 22, 1938 |
| 2,273,557 | Bonotto | Feb. 17, 1942 |
| 2,436,375 | Booth et al. | Feb. 24, 1948 |
| 2,491,912 | Walker | Dec. 20, 1949 |
| 2,670,078 | Davis | Feb. 23, 1954 |
| 2,772,234 | Kelly | Nov. 27, 1956 |